W. F. BROWN.
SPEED INDICATOR.
APPLICATION FILED SEPT. 2, 1908.
1,001,613.
Patented Aug. 29, 1911.
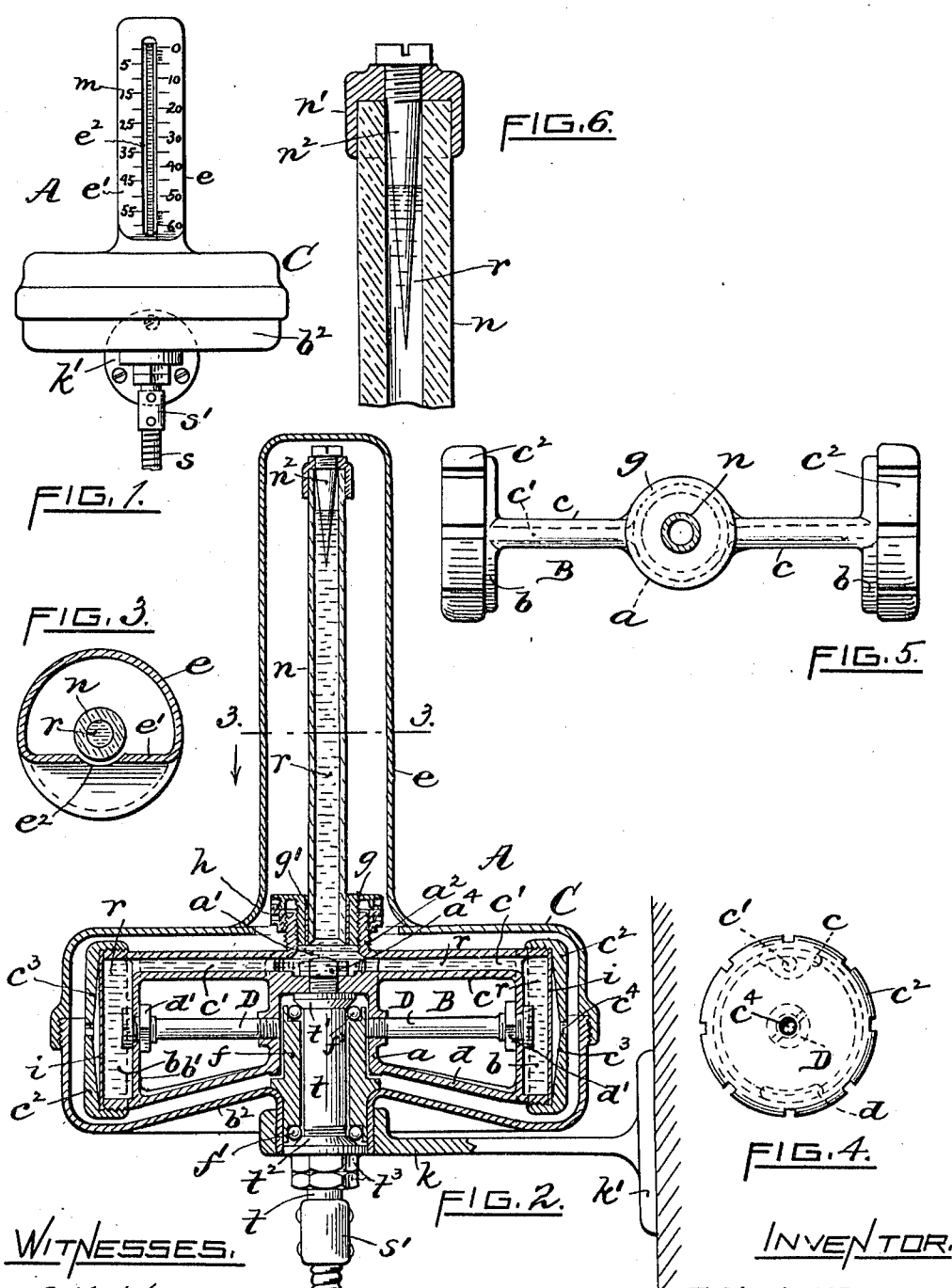

UNITED STATES PATENT OFFICE.

WALTER F. BROWN, OF WORCESTER, MASSACHUSETTS.

SPEED-INDICATOR.

1,001,613.	Specification of Letters Patent.	Patented Aug. 29, 1911.

Application filed September 2, 1908. Serial No. 451,325.

*To all whom it may concern:*

Be it known that I, WALTER F. BROWN, a citizen of the United States of America, and a resident of Worcester, in the county of Worcester and State of Massachusetts, have invented certain new and useful Improvements in Speed-Indicators, of which the following is a specification.

This invention relates to speed indicators, so-called, that is devices of the type or class arranged and adapted, when suitably connected say with a vehicle or car, to indicate, within the range of its maximum and minimum limits, on a properly graduated dial or gage the speed at which the vehicle or car may be traveling.

To that end the invention consists in the novel construction and arrangement of the members of the device and in which is employed a confined fluid or liquid medium, as mercury, resisted by diaphragms, and in which variations in the speed of movement or rotation operate in conjunction with the action of centrifugal force to change the visible level of the fluid to correspond or accord with the previously spaced indices or graduations of the gage, all as more fully hereinafter set forth and claimed.

The objects sought to be attained in the present invention may be briefly stated as follows: to produce a compact, simple, comparatively inexpensive, efficient and durable speed indicator; the device at the same time being practically frictionless (only one bearing or joint being employed), easily accessible and not liable to get out of order. The elements entering into its operation, such for example as gravity, centrifugal force and mercury, are fixed and unchangeable.

It may be added that owing to the fact that no pistons, wheels, gears, cams, springs, levers or movable connections are employed and also that the interior of the apparatus is dust and moisture-proof, the action of my improved speed indicator is more sensitive to variations in the speed; the reading level of the fluid is relatively steady by reason of the absence of jarring or vibrations of the mercury column; the device is equally reliable and accurate irrespective of the direction of rotation of the driving means, and since no movable pointers or hands are used the liability of multiplication of errors in the readings is reduced to a minimum.

In the accompanying sheet of drawings, Figure 1 represents, in reduced scale, a speed indicator embodying my present improvements. Fig. 2 is a vertical central sectional view, in enlarged scale, showing the interior construction, as in use; the relation of the said parts corresponding to the stationary or zero position. Fig. 3 is a horizontal sectional view taken on line 3 3 of Fig. 2. Fig. 4 is an end view of one of the caps of the fluid-holding cups of the revoluble head member. Fig. 5 is a plan view of the latter detached, and Fig. 6 is an enlarged longitudinal central sectional view of the upper end portion of the glass mercury-tube and its cap.

The following is a more detailed description of my improved centrifugal force speed indicator A, and including the manner of its operation: The rotatable main member B, which may be termed the head, is integral and consists of the hub part $a$, a plurality of radially arranged capped cups or outer chambers $b$ in continuous open communication with an upper central chamber $a^1$, and a screw-threaded central nozzle-like portion extending upwardly from the top of the head. The head proper may be cast or formed of a metal having a comparatively high coefficient of thermal expansion, as aluminum, and having the said cups $b$ disposed at the outer ends of upper and lower arms, $c$, $d$, connected with and extending radially from the hub. The lower portion of the hub is recessed to freely receive the stationary bearing member $f$, soon to be described. The said upper connection $c$ has a small passage $c^1$ communicating with its cup member and with the said chambered part $a^1$ of the nozzle $a^2$. A tube-holding gland-like member $g$ is screwed into the nozzle; an annular check-nut $h$ screwed to the exterior of the nozzle serving to maintain the member $g$ and its tube in adjusted position. As drawn, each cup $b$ is cylindrical and shallow, its axis being horizontal. The outer end of the walls of the cup is faced off true to receive the corresponding edge portion of a vertically arranged thin hardened steel disk-shaped elastic diaphragm $i$ which is rigidly held in position peripherally by the cap or cover $c^2$ screwed to the cup. The inner face $c^3$ of the cap is slightly concave or beveled so as to permit a limited outward expansion of the diaphragm and has a small central air-hole $c^4$.

A hardened steel rod or bolt D extends horizontally through the center of the bottom $b^1$ of each cup $b$ and is tapped into the hub $a$; a nut $d^1$ maintaining the parts in position. The rods D have a low coefficient of expansion and are employed to correct the result due to changes in temperature. That is to say, the cubical volume of the chambers of the cups and the contained mercury will at least to some slight extent vary with the temperature, therefore I employ the rods D having a comparatively small degree or ratio of expansion and contraction, as stated, to practically hold the bottom wall $b^1$ in the normal position at all times, except of course as it may move very slightly in a lateral direction in unison with the rod itself. This provision or construction is equally efficient and reliable whether the device is in rotative action or stationary, therefore the level of the mercury column with respect to the graduations or index marks on the dial or gage will truly register or indicate the speed irrespective of the temperature.

It is to be noted that each diaphragm $i$ remains in its normal state and is practically unaffected by variations in temperature of the mercury bearing upon or against it. The diaphragm vibrates or moves outwardly (that is its unconfined part) toward the cap $c^2$ solely by the action of centrifugal force upon the mercury when the apparatus is in motion, the maximum speed (as for example 60 on the gage) being attained when the mercury level in the glass tube drops to said figure, the diaphragm at the same time then being expanded say to its limit, that is, bearing against the curved or beveled surface $c^3$ of the cap. I prefer that the shape of said surface in conjunction or connection with the diaphragm itself be such as to cause a variable resistance which will permit of the use of a scale, as $m$, having uniform divisions.

The casing or housing C is stationary and is divided horizontally, its two members being screwed together. The lower member $b^2$ has an upwardly projecting annular central part or hub $f$ secured to or integral therewith and extending into the hub part $a$ of the head B; the same being bored to freely receive the revoluble shaft or spindle $t$. The upper portion of the shaft passes through and is firmly secured to the head in any suitable manner. As drawn the shaft extends into the central mercury chamber $a^1$ at the base of the glass tube $n$ and is removably secured to the head by means of a nut $a^4$.

A flange $t^1$, integral with the shaft, forms a supporting shoulder for the head; it is also provided with a beveled face which in connection with the adjacent recessed end of the said members $f$ and a series of hardened steel balls $f^1$ mounted therein and normally bearing against said beveled surface constitute the upper portion of the anti-friction bearing. The opposite end of the hub is also arranged to receive a series of anti-friction balls, these latter bear against the beveled surface of a collar $t^2$ screwed to the shaft and form the lower portion of said bearing. The collar is held in the adjusted position by means of nuts $t^3$. The bottom end of the shaft is secured to a coupling $s^1$; the latter is also adapted to be secured to suitable driving means, as for example a flexible shaft $s$ capable of transmitting rotary movements to the apparatus from the vehicle or source whose speed is to be indicated.

A glass or transparent tube $n$ of comparatively small caliber has its lower end cemented or otherwise secured at $g^1$ in the central screw-gland member $g$, whereby the tube is capable of being moved in a vertical direction bodily with it. The upper end of the tube is surmounted by a fixed cap $n^1$ in which a tapering screw-threaded plug $n^2$ is movably fitted. By means of this latter the normal level of the mercury or fluid in the tube $n$ may be accurately corrected, the change being due to the corresponding displacement of the immersed surface of the plug.

Secured to or integral with the upper part of the housing C is located a central incasing tube $e$ of metal, the same inclosing and protecting the glass tube $n$. The front side of the tube $e$ has a flattened surface $e^1$ carrying a suitable scale or index $m$, the graduations thereof being spaced to correspond with any desired unit of indication, as for example, revolutions per minute, miles per hour, &c. A narrow vertical slit $e^2$ (Figs. 1 and 3) is formed centrally in said surface $e^1$ so as to render visible the extreme range of levels of the fluid in the glass tube. The flattened wall may be cut away so that its face will lie substantially even or flush with the outer proximate surface of tube $n$, as clearly shown in Fig. 3, thus rendering the readings clearer.

The apparatus proper may be supported vertically in a horizontal bracket $k$ having a base or flange $k^1$ adapted to be secured to any conveniently located surface.

In practice the previously adjusted, suitably graduated and mercury-charged speed indicator A or tachometer, embodying my invention, is mounted and connected in any well-known way so as to transmit rotary movement to its spindle $t$ from the wheels or other revoluble part of the vehicle or moving structure whose speed it is desired to register. As before stated, the arrangement is such that the mercury-level will lie at the zero or "0" mark while the indicator remains stationary or inactive, and this too irrespective of a range of temperatures say of 150°. Upon rotating the head B and the parts attached to it, which also includes the glass mercury-tube, the centrifugal force due to the speed of rotation will press or impinge the mercury against the elastic diaphragms and cause them to expand or bulge outwardly a corresponding extent. The thus temporarily and slightly increased space in the cup's chambers is supplied with mercury from the revolving tube $n$, its level being depressed accordingly and indicating for the time being the speed, or in this case miles per hour. Should the speed exceed the limit provided for on the scale (or 60) the level of the mercury simply passes below the scale and is not recorded or visible. In practice, however, the surface $c^3$ of the caps $c^2$ may be made so that the diaphragms will lie snugly upon them when the maximum speed (60) is attained. The mercury then remains at said point or level and any speed exceeding it would not be indicated. Conversely, upon decreasing the speed until a full stop is made the action of the apparatus and the lessened centrifugal force permit the mercury to correspondingly rise in the tube $n$ until the zero point is reached, at which instant the diaphragms again assume their normal position.

In my improved speed indicator all joints are discarded and provision is made for varying the resistance inversely as the square of the revolutions, while at the same time practically eliminating friction and wear. Two of the forces employed, viz., gravity and centrifugal, are fixed and unchangeable.

It may be observed that in the device herewith provision is made for heat expansion or automatic control while at the same time the expansible chambers $b$ are adapted to yield or be pressed outward by the action of centrifugal force of the fluid $r$ due to the speed of rotation of the head B; the corresponding level of the fluid in the revolving glass tube then indicating upon the scale the speed of rotation. If desired the fluid used in the tube $n$ and the central chamber $a^1$ may have a different color and specific gravity than that of the fluid in the chambers $b$ and passages $c^1$. In such case the two fluids may not combine or unite with each other, thus rendering the level in the sight-tube $n$ more readily distinguishable.

I claim as my invention and desire to secure by United States Letters Patent—

1. As a new and improved article of manufacture, a centrifugal force speed indicator having a revolubly mounted head member provided with intercommunicating central and outer chambers for containing a fluid, one or more of the walls of the outer chambers being elastic and exposed to atmospheric pressure on one side and to said fluid on the other, whereby when in use the cubical capacity of the outer fluid-holding chambers is automatically changed by the action of centrifugal force, and means for indicating said changes or variations.

2. A centrifugal force speed indicator consisting of a suitably mounted revoluble head member comprising a central chamber for containing a fluid, a plurality of hollow members movable in unison with the head, forming outer fluid-holding chambers in open communication with the central chamber, and having a wall of each of said outer chambers elastic and arranged to be exposed to atmospheric pressure on one side and fluid on the other, a sight tube mounted in the head and being in open communication with the central chamber, and a suitably graduated scale arranged with relation to the sight tube.

3. In a speed indicator of the character described, a head or casing member having a high coefficient of expansion provided with a central chamber and a plurality of chambered cups communicating with said central chamber and extending radially therefrom, a diaphragm mounted in the outer end of each cup-chamber, and tie-rods or members having a low coefficient of expansion connecting the bottom walls of said cups with the hub, whereby the chambers are capable of expanding so as to slightly increase their normal capacity upon relatively increasing the temperature.

4. In a speed indicator of the character described, the combination of a revoluble head having a central chamber, a transparent tube bodily movable with and extending vertically from the head and being in continuous open communication with said chamber, a plurality of radially disposed chambered cup members integral with the head communicating with said central chamber, a resilient diaphragm removably mounted in the outer end of each cup, and a fluid normally filling said tube and chambers and pressing against the diaphragms.

5. In a speed indicator of the character described, a revoluble mercury-charged hollow head having a central transparent visible tube secured thereto normally filled with the mercury, a plurality of cups integral with the head member, a diaphragm mounted in the outer end of each cup, and a stationary scale or index provided with graduations for indicating varying changes in the level of the mercury in the tube corresponding with variations in the rotative speed of the head, constructed and arranged whereby the force of gravity acts to continuously and uniformly press the mercury downwardly against the inner surface of the diaphragm while the centrifugal force due to the speed only acts upon the mercury and diaphragms to increase the capacity of the cup-chambers.

6. In a speed indicator of the character described, a revoluble centrally chambered head member having a radially disposed cup provided with a chamber normally filled with a fluid in direct communication with said central chamber, an elastic diaphragm removably mounted on the outer end of the cup and constituting its end wall, means for holding the diaphragm in place, and having the outer surface of the diaphragm exposed to atmospheric pressure, its inner surface at the same time being pressed by the fluid, thereby providing a cup-chamber whose cubical capacity is capable of being changed automatically by the action of centrifugal force.

7. In a speed indicator of the character described, the combination of a revolubly mounted head having a central chamber, a chambered cup member integral with the head, said chambers being in open communication with each other, a resilient diaphragm secured to the cup and forming its outer end wall, and a fluid completely filling the chambered portions of the head and cup, constructed and arranged whereby the cubical capacity of the cup chamber is changed by the combined action of centrifugal force and gravity, substantially as hereinbefore described.

8. In a speed indicator of the character described, the combination with a centrally chambered fluid holding revolubly mounted head, a plurality of radially disposed chambered cups in open communication with the chambered portion of the head and bodily revoluble in unison with the latter, and a fluid holding vertical glass tube mounted in the head and revoluble with it having its lower end in continuous open communication with the head's chamber, of a surrounding protecting tube or casing having its front side flattened or recessed and slitted longitudinally to expose or render visible the corresponding portion of the glass tube, and a suitably graduated scale arranged on said recessed part.

9. In a speed indicator of the character described, the combination with a separable outer casing, and means for securing the same in a fixed position, of a centrally chambered head member revolubly mounted and supported in the casing, a visible central transparent tube communicating with said chamber and fixed vertically in said head, a plurality of radially arranged fluid holding outer cup members continuously communicating with said tube and forming a part of the head, each cup having one of its walls elastic and exposed to atmospheric pressure on one side and to said fluid on the other, whereby when in use the cubical capacity of the cup chamber is automatically changed by the action of centrifugal force.

10. In a speed indicator of the character described, the combination with the revoluble head member having a central space or chamber for containing fluid, of a vertically disposed glass tube in open communication with said chamber, means for securing the tube to said head so as to rotate bodily in unison with it, and means for adjusting or varying the position of the tube endwise with respect to the chamber.

11. In a speed indicator of the character described, the combination of a revoluble fluid-carrying transparent or sight tube, a cap surmounting its upper end, and a taper-shank bolt or analogous member adjustably mounted in the center of said cap and extending downward into the bore of the tube, whereby slight changes in the normal level of the fluid in the tube may be readily and accurately corrected.

12. In a speed indicator of the character described, the combination of a revolubly mounted chambered head, a glass sight tube in open communication with and concurrently revoluble with the head, a suitable fluid or fluids sealed in and practically filling the interior of the head and tube, means adapted to control and normally maintain a practically invariable level of the fluid in said tube irrespective of the temperature, and means yieldable by the pressure of centrifugal force upon the fluid in the head whereby corresponding variations of the level of the fluid in the tube are produced.

13. In a speed indicator of the character described, the combination of a revoluble head having a central chamber, hollow members capable of expansion and contraction in open communication with said chamber, means for correcting changes in the head and its connecting members due to heat expansion, a vertical central glass tube secured to and revoluble with the head, a fluid filling the interior portions of the head, hollow members and tube, a fixed indicating scale, means for adjusting or correcting the normal level of the fluid in the tube, and a stationary supporting case adapted to be suitably positioned.

14. In a speed indicator of the character described, the combination of a centrally chambered revolubly mounted head for containing a fluid, a glass tube for holding a mobile fluid, adjustably mounted in a vertical position in the center of the head and being in open communication with its chamber, a taper-plug extending into the bore of the tube for variably changing the area of the latter within fixed limits, and means for accurately adjusting the position of the plug.

15. In a speed indicator of the character described, the combination of a suitably supported revolubly mounted head provided with a central chamber, peripherally disposed members connected to the head having expansible outer chambers adapted when charged to have their cubical capacity changed by the action of centrifugal force in open communication with said central chamber, the exterior walls of each outer chamber being exposed to atmospheric pressure, a vertically extending transparent sight tube mounted in and being revoluble with the head and in open communication with the latter's chamber, a fluid normally filling said chambers and tube, an indicating scale arranged with relation to the tube, and means for causing the fluid in the tube when at a state of rest to lie at a zero level.

16. In a speed indicator of the character described, a revolubly mounted head member having a central chamber for containing a fluid, a hollow member connected to and revoluble in unison with the head provided with an outer chamber in open communication with the central chamber, a wall of the outer chamber member being elastic whereby the cubical capacity of the chamber automatically changes with the internal force or pressure upon the elastic wall, and an inelastic cap or member for limiting the outward expansion of said wall.

17. In a speed-indicator of the character described, the combination of a hollow, chambered head member mounted for rotation and having an elastic outer wall, a vertical sight-tube secured to and revoluble with said head member in open communication with the latter's chamber, a fluid normally filling the interior of the head and tube, a scale having graduations for indicating variations in the height of the fluid in the sight-tube, and a relatively stationary recessed cap member disposed adjacent said elastic wall for limiting the outer movement of the latter and the corresponding increase in the cubical capacity of the chamber.

Signed at Worcester this 29th day of August 1908.

WALTER F. BROWN.

Witnesses:
EDWARD J. MELAREFY,
EARLE BROWN.

---

Copies of this patent may be obtained for five cents each, by addressing the "Commissioner of Patents, Washington, D. C."